US009239225B2

(12) United States Patent
Pasternak (10) Patent No.: US 9,239,225 B2
(45) Date of Patent: Jan. 19, 2016

(54) FOURIER-TRANSFORM INTERFEROMETER WITH SELF-APODIZATION COMPENSATION

(71) Applicants: ASTRIUM SAS, Suresnes (FR); CENTRE NATIONAL D'ETUDES SPATIALES C N E S, Paris (FR)

(72) Inventor: Frédéric Pasternak, Gaure (FR)

(73) Assignee: Airbus Defence and Space SAS, Les Mureaux (FR)

( * ) Notice: Subject to any disclaimer, the term of this patent is extended or adjusted under 35 U.S.C. 154(b) by 0 days.

(21) Appl. No.: 14/304,240

(22) Filed: Jun. 13, 2014

(65) Prior Publication Data
US 2014/0368824 A1    Dec. 18, 2014

(30) Foreign Application Priority Data
Jun. 13, 2013 (FR) ...................................... 13 01365

(51) Int. Cl.
*G01B 9/02* (2006.01)
*G01J 3/45* (2006.01)
*G01J 3/453* (2006.01)

(52) U.S. Cl.
CPC ........ *G01B 9/02049* (2013.01); *G01B 9/02015* (2013.01); *G01J 3/45* (2013.01); *G01J 3/4535* (2013.01); *G01J 3/4537* (2013.01)

(58) Field of Classification Search
CPC ............ G01B 9/02049; G01B 9/02015; G01J 3/4535; G01J 3/4537; G01J 3/45
See application file for complete search history.

(56) References Cited

U.S. PATENT DOCUMENTS

| 4,585,345 A | 4/1986 | Inoue |
| 4,697,882 A * | 10/1987 | Sato et al. ..................... 359/640 |
| 2011/0032530 A1* | 2/2011 | Buisset et al. ................ 356/451 |
| 2013/0003072 A1 | 1/2013 | Buil et al. |

OTHER PUBLICATIONS

Clement Luitot ; Joël Boyadjian ; Christian Buil ; Frederick Pasternak, Optical Architecture of the new generation Infrared Atmospheric Sounder Interferometer (IASI-NG), Proc. SPIE 8841, Current Developments in Lens Design and Optical Engineering XIV, 88410M (Sep. 25, 2013); doi:10.1117/12.2025236.*
Al-Saeed, Tarek, et al. "Spot size effects in miniaturized moving-optical-wedge interferometer", Applied Optics, Optical Society of America, vol. 50, No. 17, Jun. 10, 2011, pp. 2671-2678. XP001563569.
Cuisenier, M., et al, "Spectrometre de Fourerier a <<oeils de chat>> et a balatage rapide". Journal de Physique, Colloquelle C2, supplement to No. 3-4, Mar.-Apr. 1967, pp. 97-104.
Griffiths, Peter, et al. "Fourier Transform Infrared spectrometry". Wiley, Dec. 31, 2007, pp. 123-124. XP002717554.
(Continued)

*Primary Examiner* — Michael A Lyons
*Assistant Examiner* — Violeta A Prieto
(74) *Attorney, Agent, or Firm* — Patterson Thuente Pedersen, P.A.

(57) ABSTRACT

A Fourier-transform interferometer with self-apodization compensation comprises at least one pair of mobile prisms forming a plate with thickness which varies at the same time as an optical path length difference is itself varied. The prisms are displaced using a mobile system with a single degree of freedom, comprising two support elements and at least two rotatably hinged levers. The interferometer is adapted to be installed on board a satellite, for spectral analysis of a radiation originating from the Earth's surface.

11 Claims, 5 Drawing Sheets

(56) References Cited

OTHER PUBLICATIONS

Roddier, F. "Traitment d'images astronomiques degrades par des fluctuations atmospheriques", Revue de Physique Appliquee, Tome 11, Mar. 1976, pp. 195-201.

Yang, Qinghua, et al. "Principle and Analysis of the moving-optical-wedge interferometer". Applied Optics, Optical Society of America, vol. 47, No. 13, May 1, 2008, pp. 2186-2191. XP001514460.

* cited by examiner

FOURIER-TRANSFORM INTERFEROMETER WITH SELF-APODIZATION COMPENSATION

RELATED APPLICATION

The present application claims priority to French Application No. 13 01365 filed Jun. 13, 2013, which is incorporated herein in its entirety by reference.

FIELD OF THE INVENTION

The present invention relates to a Fourier-transform interferometer with self-apodization compensation.

BACKGROUND OF THE INVENTION

Using an interferometer for characterizing a spectral distribution of a radiation is commonplace. The interferometer produces an interference state between two secondary beams that originate from a single initial radiation beam and follow separate intermediate optical paths. A difference in length between the optical paths is varied, causing in turn a variation in the intensity of an output beam formed by superimposing both secondary beams. The spectral distribution of the radiation is obtained based on a Fourier transform of the intensity of the output beam, with respect to a parameter representing the difference in length between the optical paths.

It is thus known that a limited variation range for the difference in length of the optical paths generates a convolution profile in the spectral distribution that results from the Fourier transform. In particular, this convolution profile can have secondary maxima on each side of the main maximum.

It is also known that the difference in length between the optical paths of the two arms of the interferometer depends on the value for the angle of incidence of the radiation. For this reason, an angular aperture that is non-zero for the radiation beams that propagate in the interferometer produces at any moment several interference states, each corresponding to a different value for the difference in length of the optical paths. This results in a modification of the convolution profile in the spectral distribution resulting from the Fourier transform, known by the term self-apodization.

As stated in the article entitled "Communications à la Société Française de Physique", by P. Connes et al, Journal de Physique, vol 24, February 1963, pages 134-138, the Mertz interferometer allows this self-apodization to be compensated. To this end a component, the optical thickness of which is variable, is introduced into at least one of the two optical paths of the interferometer, and its optical thickness is varied at the same time as the difference in length between the two optical paths is also varied. When the two variations are suitably adjusted in relation to each other, the self-apodization of an interferogram obtained by means of the interferometer is compensated.

Figure 1A:
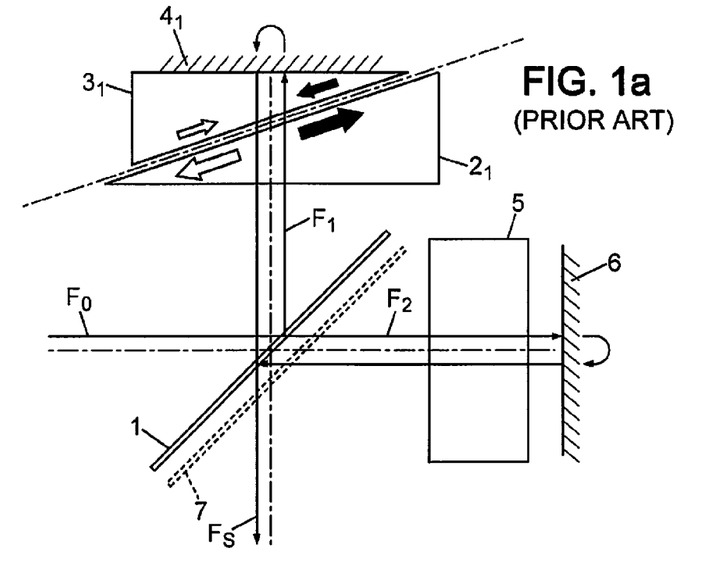
FIG. 1a is an optical principle diagram as known before the present invention, for a Fourier-transform interferometer with self-apodization compensation.

FIG. 1a is a functional optical diagram of such an interferometer with self-apodization compensation. The overall structure is that of a Michelson interferometer, with the references indicated in the figure having the following meanings:

F0 and FS initial beam and output beam, respectively,
1 and 7 splitting and compensating plates, respectively,
F1 and F2 secondary beams,
21 and 31 prisms arranged in opposite directions, preferably having equal apex angles and being possibly constituted by one same transparent material,
41 external face of the prism 31, having a reflecting surface effective for the radiation,
6 planor mirror, and
5 compensation assembly, possibly being a transparent plate with parallel faces.

At least one of the two prisms 21 and 31 is mobile in order to constitute, with the other prism, the variable-thickness optical element. In particular, the two prisms 21 and 31 can be moved simultaneously in opposite directions according to either one of the pairs of black or white arrows shown in the figure, in which an arrow shown on one of the prisms relates to this prism. The self-apodization compensation is obtained close to the optical axis when the following relationship is satisfied for each position of the prisms 21 and 31: $D = e \cdot (n-1)/n$, where D is the difference in geometrical length between the two optical paths, measured along the axis of the interferometer, e is the difference in thickness between the compensation assembly 5 and the optical element formed by the two prisms 21 and 31, also measured along the axis of the interferometer, and n is the refractive index of the prisms 21 and 31 and of the plate that forms the compensation assembly 5, in the case where these three components are constituted by one same transparent material.

Many applications need to characterize the spectral distribution of a radiation under specific operating conditions. Such is the case, in particular, for analyzing from a satellite of a radiation originating from the Earth's surface. The interferometer must thus be robust, have reduced weight and dimensions, and its operation must be reliable and accurate.

SUMMARY OF THE INVENTION

An object of the present invention thus consists in proposing a Fourier-transform interferometer with self-apodization compensation that meets these demands.

In order to achieve this object or others, the present invention proposes an interferometer comprising:

a beam splitter, adapted to split an initial radiation beam into two secondary beams;

two optical arms, equipped with reflecting surfaces effective for the secondary beams, each arm being intended for one of the secondary beams and being in outward-return form between the splitting plate and the reflecting surface of this arm, the reflecting surfaces being oriented in order to superimpose from the splitting plate, the two secondary beams originating from the respective arms in an output beam;

in a first one of the optical arms: a variable-thickness system comprising two mobile prisms called respectively internal and external, the external prism having an external face constituting the reflecting surface of the first optical arm;

in a second one of the optical arms: a mirror constituting the reflecting surface of the second optical arm, and a compensation assembly adapted so that respective optical thicknesses of the compensation assembly and of the variable-thickness system of the first optical arm are equal when an optical path length difference between the two optical arms is zero;

a mobile system, which is adapted to displace the internal and external prisms along directions that are opposite and parallel to facing surfaces of the prisms, so as to modify simultaneously an optical path length of the first optical arm and the thickness of the variable-thickness system;

an output optical arm, comprising a detector arranged to receive the output beam, and produce a signal representing the intensity of this output beam; and a calculation unit, which is adapted to calculate a Fourier transform of the signal produced by the detector, as a function of a parameter representing the difference in length of the optical path between the two arms.

The interferometer of the invention is characterized in that the mobile system has a single degree of freedom of movement and itself comprises:

at least one pair of levers having identical lengths within one and same pair, which are rotatably hinged about respective points that are fixed with respect to the splitting plate along respective main axes parallel to each other within the pair of levers, by means of rotating connexions, each with one single axis; and two support elements each borne by the two levers of one and the same pair by means of additional rotating connexions, each with one single axis parallel to the main axes of the pair of levers; and an actuation system, adapted to cause a rotation of the levers so that each support element is displaced while remaining parallel to itself when the actuation system is activated.

The internal and external prisms are borne respectively by the two support elements, and a ratio between respective displacement lengths of the internal and external prisms is constant and set by distances between the fixed points and the additional rotating connexions. In this way, the mobile system simultaneously produces a variation of the optical path length difference between the two optical arms and a self-apodization compensation for an interferogram that results from the signal produced by the detector when the actuation system is activated.

Thus, an interferometer according to the invention is an interferometer of the Mertz type. One of the improvements resides in the single mechanism, with a single degree of freedom, which produces the displacements of the two prisms simultaneously. Synchronization between these displacements is thus ensured automatically. Moreover, the amplitudes of the displacements are determined by fixed lengths of mechanical elements, so that these amplitudes remain definitively set. The interferometer of the invention therefore operates in a manner that is both simple and robust, while producing a compensation of the self-apodization.

In simple embodiments of the invention, the mirror of the second optical arm may consist of a reflecting treatment of an external face of the compensation assembly.

Moreover, in order to reduce any uncertainties that would be caused by mechanical looseness, each rotating connexion may be constituted by a flexural pivot. The interferogram obtained is then more accurate and more reproducible with respect to the displacements of the mobile system.

First embodiments of the invention may implement one single pair of levers only. In this case, the two support elements may be borne by these two levers so as to form therewith a deformable parallelogram. Moreover, for each lever, the fixed point about which it is rotatably hinged may be situated between the two additional rotating connexions respectively bearing the two support elements for this lever. Such a mechanism, which is based on a deformable parallelogram, is particularly robust.

Second embodiments of the invention may implement two separate pairs of levers. Another mechanism may then be implemented for the mobile system, in which each support element is borne by the levers of a pair that is different from that of the levers bearing the other support element. In this case, the actuation system is connected to one of the levers of each pair so as to cause displacements that are parallel but in opposite directions at any moment, for the two support elements.

In preferred embodiments of the invention, the two optical arms may have similar structures. To this end, the compensation assembly of the second optical arm may itself comprise an internal prism and an external prism that are additional to the internal and external prisms of the first optical arm, with respective surfaces facing each other that are parallel between the internal and external prisms of the second optical arm. The mirror may then be borne by an external face of the external prism of the second optical arm, for example in the form of a reflecting layer on this external face. Moreover, the internal and external prisms of the second optical arm are also connected to the mobile system, but so that the length of the optical path of one of the optical arms increases at the same time as the length of the optical path of the other optical arm reduces, when the actuation system is activated. In this way, the two optical arms participate cumulatively in the variations of the optical path length difference, so that these variations can have greater amplitudes. A monochromatic radiation is then rendered with a smaller apparent spectral width, such as resulting from the Fourier transform. But another way, the convolution profile in the spectral distribution that results from the Fourier transform is sharper for any monochromatic component of the radiation.

Advantageously, the respective external prisms of the two optical arms may be fixed together on a single one of the two support elements, and the respective internal prisms of the two optical arms may be fixed together on the other one of the two support elements. The same mechanism thus produces both the lengthening of the optical path of one of the two arms, and the shortening of the optical path of the other arm. The maximum amplitude of the variation of the difference in length between the two optical arms is thus increased, while still retaining only one single mobile system with a single degree of freedom of movement. In this case, the two optical arms of the interferometer may be antisymmetrical with respect to each other for respective orientations of the external prisms on the one hand, and for respective orientations of the internal prisms on the other hand.

Generally, in each optical arm, the internal and external prisms may have apex angles that are identical, and may be constituted by one same transparent material. Optionally, the apex angle may be identical for the four prisms, as well as the material of which they are constituted.

Since an interferometer according to the invention may be particularly suitable for operating in a space environment, the invention also proposes a method for the spectral analysis of a radiation originating from a portion of the Earth's surface. The method comprises the following steps:

installing on board a satellite at least one optical and mechanical part of an interferometer as described previously;

orbiting the satellite around the Earth;

orienting the satellite so that a part of the radiation constitutes the initial beam;

while the radiation part propagates in the two optical arms of the interferometer, activating the detector and the actuation system simultaneously; and calculating the Fourier transform of the signal produced by the detector, as a function of the parameter representing the difference in the length of the optical path between the two arms, in order to obtain a spectral distribution characteristic of the radiation.

Optionally, the calculation unit of the interferometer may be situated on Earth. The signals produced by the detector for variable values of the difference in the length of the optical path between the two arms are then transcribed into a transmission format and then transmitted from the satellite to the calculation unit.

BRIEF DESCRIPTION OF THE DRAWINGS

Other features and advantages of the present invention will become apparent from the following description of non-limitative embodiments, with reference to the attached drawings, in which.

In the sake of clarity, the dimensions of the elements shown in the figures do not necessarily correspond either to actual dimensions or to actual dimension ratios. Moreover, identical references that are indicated in different figures denote identical elements, or elements with identical functions.

DETAILED DESCRIPTION OF THE DRAWINGS

FIG. 1a has already been described as prior art available before the present invention. The prisms 21 and 31 are called respectively internal prism and external prism for the first optical arm of the interferometer, the internal prism being the closest to the splitting plate 1 and the external prism bearing the surface 41 that reflects the radiation of the beam F1. The prisms 21 and 31 may be mobile simultaneously in opposite directions to each other, parallel to a common direction of displacement and parallel to their respective facing surfaces, in order to form together a plate with parallel faces of variable thickness. Their apex angles may be identical, and they may consist of one same material, both refringent and transparent. Moreover, the respective lengths of the prisms 21 and 31 in their direction of displacement may be adapted as a function of their respective maximum displacement. Such an embodiment of self-apodization compensation is known to a person skilled in the art.

Figure 1B:
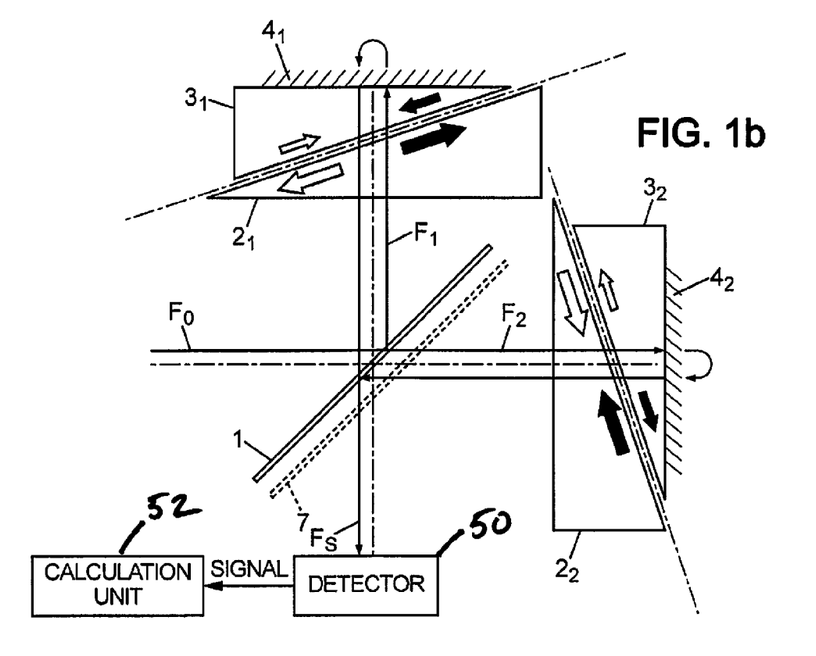
FIG. 1b is another optical principle diagram for a Fourier-transform interferometer with self-apodization compensation, to which the invention can also be applied.
Figure 3:
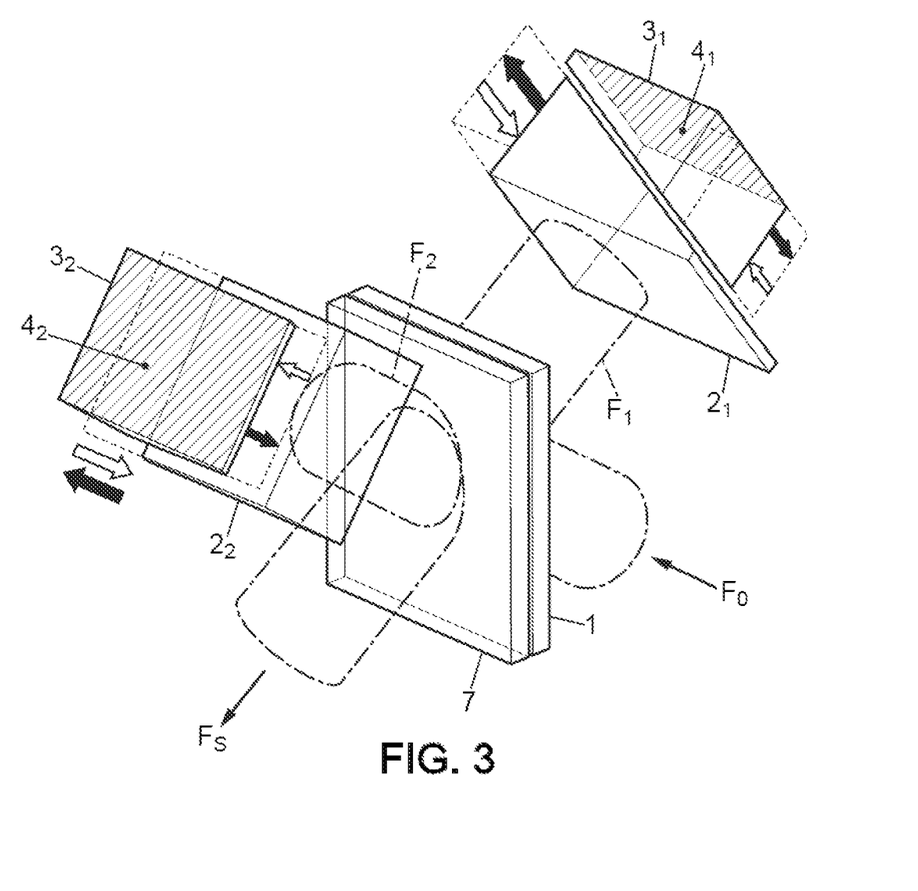
FIG. 3 is a perspective view of optical components of an interferometer according to FIG. 1b.

FIGS. 1b and 3 correspond to an improvement in the optical principle of FIG. 1a. The two optical arms of the interferometer are provided with internal and external prisms. The internal and external prisms of the second optical arm are referenced respectively 22 and 32. Moreover, the external face 42 of the prism 32 may be reflecting, so as to reflect the secondary beam F2 toward the splitting plate 1, replacing the mirror 6. Preferably, the prisms 22 and 32 of the second optical arm of the interferometer may be identical respectively to the prisms 21 and 31 of its first optical arm. The four prisms are displaced simultaneously so that the length of the optical path of one of the optical arms increases while that of the other optical arm reduces, while satisfying the self-apodization compensation relationship. Thus the four prisms are displaced simultaneously following the black arrows shown in FIGS. 1b and 3, or following the white arrows, each thick (respectively thin) arrow relating to the internal (respectively external) prism on which or close to which it is shown. In this way, the plate with parallel faces that is constituted by the prisms 21 and 31 of the first optical arm increases in thickness at the same time as the thickness of the plate with parallel faces that is constituted by the prisms 22 and 32 of the second optical arm reduces, and vice versa.

An output optical arm of the interferometer, between the splitting plate 1 and a detector 50 of the intensity of the output beam FS, may have one of the structures known to a person skilled in the art. In particular, such an output arm may comprise optical components for adaptation of the section and/or the convergence of the beam FS, between the splitting plate 1 and the detector 50. Similarly, a calculation unit 52 that is adapted to calculate a Fourier transform of the interferogram which is produced by the detector during the displacement of the prisms is known per se.

One of the main features of the invention relates to the system of support and displacement of the prisms, in order to displace them in the manner that has just been described. In this sense, the invention may be applied to an interferometer according to FIG. 1a as well as FIG. 1b. Firstly, a description will be provided for an interferometer with optical structure according to FIG. 1a, with reference to FIG. 2a. This will then be extended to the interferometer optical structure of FIG. 1b, with reference to FIG. 2b.

Figure 2A:
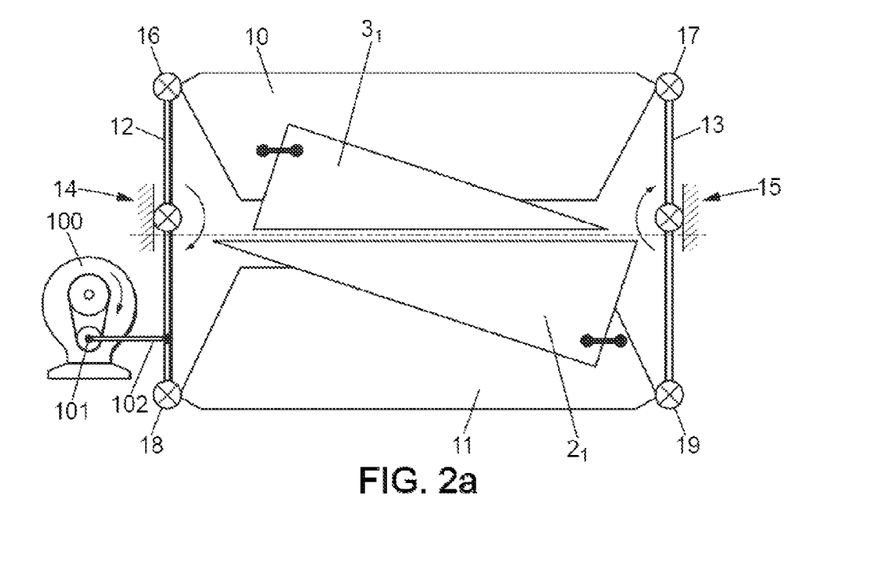
FIGS. 2a and 2b are kinematic diagrams of mobile systems which may be implemented respectively for the interferometers of FIGS. 1a and 1b.

FIG. 2a is a kinematic diagram of the mobile system for the support and displacement of the prisms 21 and 31. The following references have the following meanings:

- 14 and 15—two support points that are fixed with respect to the splitting 1 and compensating 7 plates;
- 12 and 13—two levers that are rotatably hinged about the fixed points 14 and 15, respectively;
- 10 and 11—two support elements, of same length, on which are fixed respectively the internal 21 and external 31 prisms;
- 16 to 19—rotating connexions that each connects one of the two support elements 10 and 11 to one of the two levers 12 and 13;
- 100, 101—a rotating motor and cam mounted on an output shaft of the motor; and
- 102—a rigid member that links the cam 101 to the lever 12, at a point of the lever 12 that is situated at a non-zero distance from the fixed point 14.

Along the lever 12, the fixed point 14 is intermediate between the rotating connexions 16 and 18. Similarly, the fixed point 15 is situated between the rotating connexions 17 and 19 along the lever 13.

The two support elements 10 and 11 and the two levers 12 and 13 together form a deformable frame as a variable parallelogram. To this end, the lengths of the two levers 12 and 13, respectively between the fixed point 14 and the rotating connexion 16 for the lever 12, and between the fixed point 15 and the rotating connexion 17 for the lever 13, are identical. Similarly, the length of the lever 12 between the fixed point 14 and the rotating connexion 18, and that of the lever 13 between the fixed point 15 and the rotating connexion 19, are also identical while being different from the previous lengths in the most of embodiments. Moreover, the lengths of the support elements 10 and 11 are equal when measured between the rotating connexions 16 and 17 for the support element 10, and between the rotating connexions 18 and 19 for the support element 11. All the rotating connexions have one single axis and are parallel to each other in order to allow the deformation of the parallelogram.

The prisms 21 and 31 are affixed respectively onto the support elements 11 and 10 so that the direction of displacement of each prism is parallel to the one of its faces that is opposite the other prism within the optical arm. This direction of displacement is perpendicular to the common direction of all the axes of the rotating connexions.

The levers 12 and 13, with the support elements 10 and 11, together form the mobile system for displacement of the prisms 21 and 31. The motor 100, the cam 101 and the member 102 form the actuation system of this mobile system.

Figure 2B:
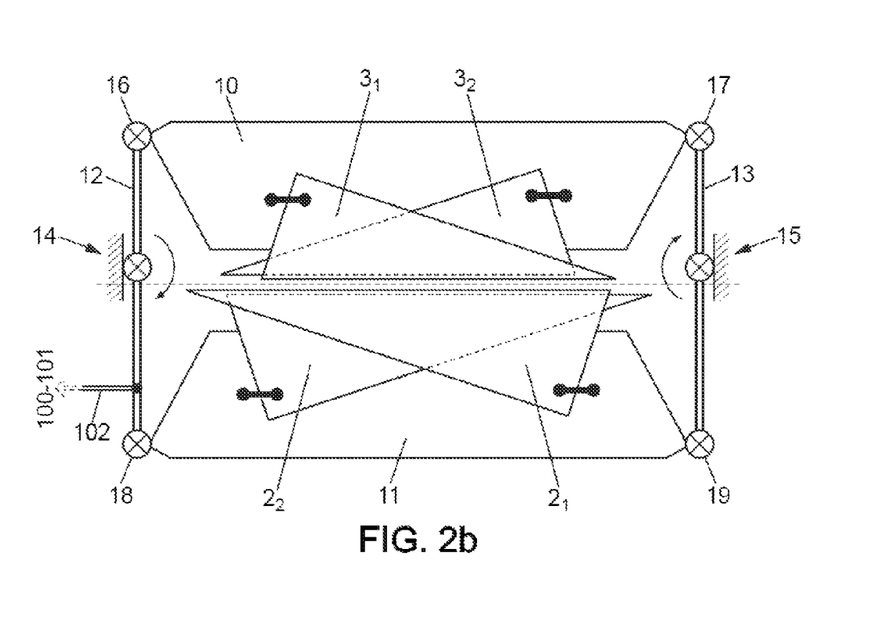

The diagram in FIG. 2b repeats that of FIG. 2a, while fixing the internal prism 22 of the second optical arm on the same support element 11 as that bearing the internal prism 21 of the first optical arm. Simultaneously, the external prism 32 is fixed on the other support element, referenced 10, with the external prism 31. In addition, the two prisms borne by each support element may be oriented in opposite directions to each other.

In two particular embodiments of the invention corresponding respectively to FIGS. 2a and 2b, the following lengths have the values that are now given:
- total length of each lever 12 or 13: 130 mm (millimeters), between the rotating connexions 16 and 18 for the lever 12, and between the rotating connexions 17 and 19 for the lever 13,
- length of the lever 12 between the fixed point 14 and the rotating connexion 16: 50 mm,
- length of the lever 12 between the fixed point 14 and the rotating connexion 18: 76 mm,
- apex angle of the four prisms 21, 31, 22, and 32: 13° (degrees),
- angle of tilt of the prisms, between the direction of displacement of the support elements 10, 11 and a direction perpendicular to the ridge of each prism and contained within the faces of the prisms that are facing: 9°, and
- refractive index of the four prisms 21, 31, 22, and 32: 2.4 when these prisms are of zinc selenide (ZnSe), for example for a use of the invention over a radiation spectral interval with wavelength comprised between 3 μm (micrometer) and 15 μm.

The self-apodization of the interferometer is compensated for these numerical values in particular.

The support elements 10 and 11 may be each 360 mm in length between the corresponding rotating connexions, despite this value has no effect with respect to the displacement of the prisms.

Figure 4:
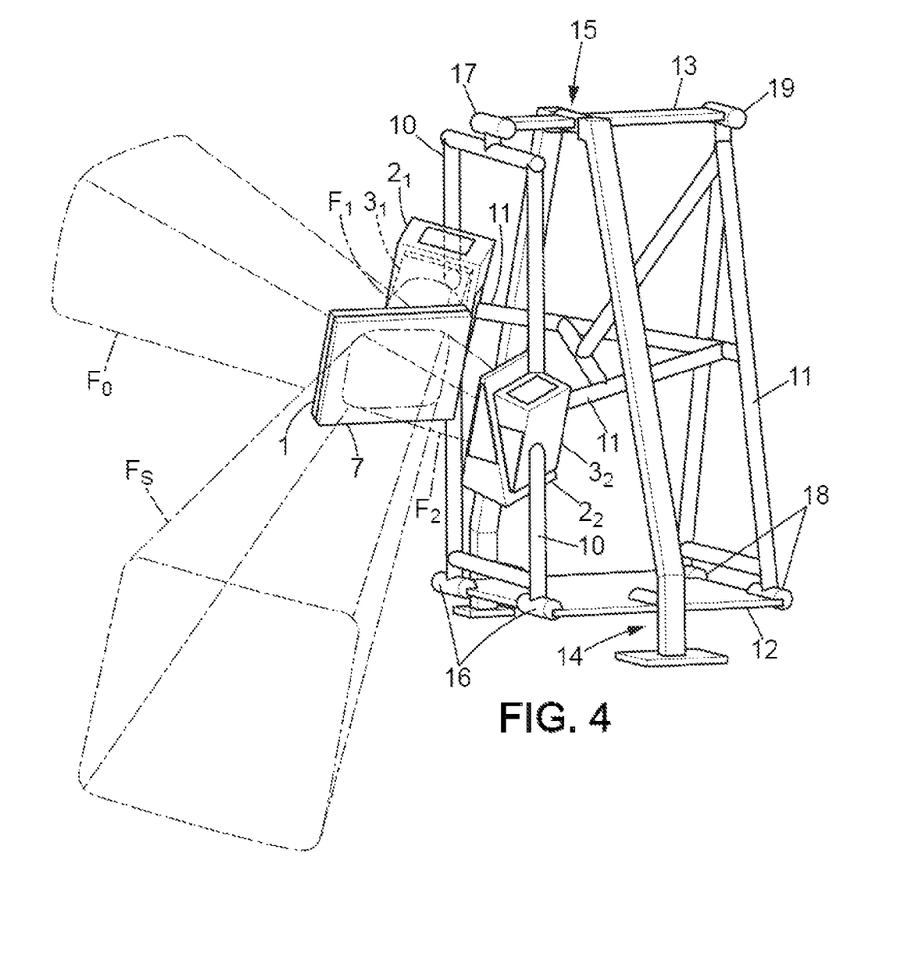
FIG. 4 is a general perspective view of the interferometer of FIGS. 1b, 2b and 3.

FIG. 4 shows a particular embodiment of the invention that corresponds to FIGS. 1b, 2b and 3. In order to improve the stability of the deformable parallelogram constituted by the support elements 10 and 11 with the levers 12 and 13, the rotating connexions 16 and 18 may be duplicated along their respective axes, and also the rotating connexion of the fixed point 14. The gap between each of these pairs of rotating connexions may be 445 mm, for example. All the rotating connexions may be constituted by flexural pivots that are commercially available, for example cross-strip pivots.

The position of one of the levers 12 and 13 with respect to its rotation about the corresponding fixed point 14 or 15 may be identified using an optical angular position sensor. Such a sensor is known. The position of the mobile system, which is thus detected in real time, makes it possible to determine the value for the difference in length of the optical path between the two optical arms of the interferometer, at any moment of operation of the motor 100 and in relation to the intensity value which is detected at the same moment for the output beam FS. These values are then the input data for the calculation of the Fourier transform, so as to obtain the spectral distribution, feature of the radiation in the initial beam F0.

Figure 5:
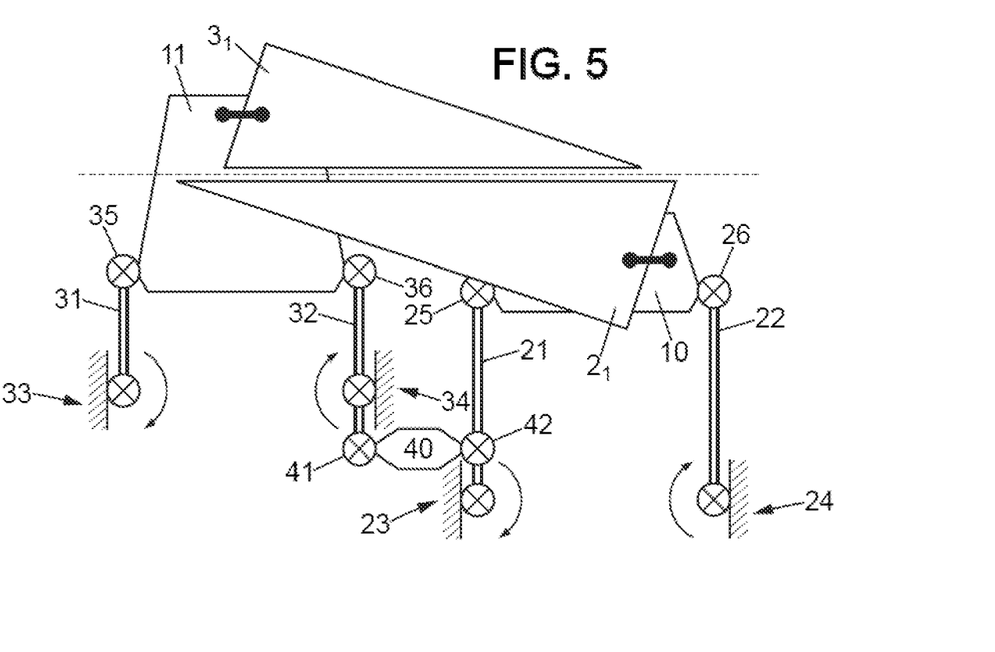
FIG. 5 corresponds to FIG. 2a for yet another embodiment of the invention.

FIG. 5 is a kinematic diagram of another embodiment of the invention, for an interferometer with optical structure which is again in accordance with FIG. 1a. The references used in FIG. 5 have the following meanings:
- 21, 22, 31, 32—levers;
- 23, 24, 33, 34—fixed points with respect to plates 1 and 7, provided with rotating connexions connected to the corresponding levers;
- 25, 26, 35, 36—rotating connexions between the corresponding levers and one of the support elements 10 or 11; and
- 40, 41, 42—actuation system and rotating connexions between this actuation system and the levers 21 and 32, respectively.

A person skilled in the art will understand without prompting the kinematic operation shown by the diagram in FIG. 5. It is merely added that the lever 31 has a length between the fixed point 33 and the rotating connexion 35 that is identical to that of the lever 32 between the fixed point 34 and the rotating connexion 36. Similarly, the lever 21 has a length between the fixed point 23 and the rotating connexion 25 which is identical to that of the lever 22 between the fixed point 24 and the rotating connexion 26. Thus the two prisms 21 and 31 are displaced with their opposite faces still remaining constantly parallel to each other. Moreover, the actuation system 40 may have a structure similar to that of FIG. 2a, but with two rigid members respectively linking the cam to the levers 21 and 32.

The diagram in FIG. 5 can be adapted without difficulty to the optical structure of the interferometer in FIG. 1b, by reproducing the procedure described above for deducing the kinematic diagram in FIG. 2b from that in FIG. 2a.

Finally, all the above-described interferometers are particularly suitable for installation on board artificial satellites, in particular due to the simplicity and robustness of their systems for the support and displacement of the prisms.

The embodiments above are intended to be illustrative and not limiting. Additional embodiments may be within the claims. Although the present invention has been described with reference to particular embodiments, workers skilled in the art will recognize that changes may be made in form and detail without departing from the spirit and scope of the invention.

Various modifications to the invention may be apparent to one of skill in the art upon reading this disclosure. For example, persons of ordinary skill in the relevant art will recognize that the various features described for the different embodiments of the invention can be suitably combined, un-combined, and re-combined with other features, alone, or in different combinations, within the spirit of the invention. Likewise, the various features described above should all be regarded as example embodiments, rather than limitations to the scope or spirit of the invention. Therefore, the above is not contemplated to limit the scope of the present invention.

The invention claimed is:

1. An interferometer comprising:
    a splitting plate, adapted to split an initial radiation beam into two secondary beams;
    two optical arms equipped with reflecting surfaces effective for the secondary beams, each arm being intended for one of the secondary beams and being in outward-return form between the splitting plate and the reflecting surface of said arm, the reflecting surfaces being oriented in order to superimpose from the splitting plate, the two secondary beams originating from the respective arms in an output beam;

in a first one of the optical arms: a variable-thickness system comprising two mobile prisms called respectively internal and external, the external prism having an external face constituting the reflecting surface of the first optical arm;

in a second one of the optical arms: a mirror constituting the reflecting surface of said second optical arm, and a compensation assembly adapted so that respective optical thicknesses of said compensation assembly and of the variable-thickness system of the first optical arm are equal when an optical path length difference between the two optical arms is zero;

a mobile system adapted to displace the internal and external prisms along directions that are opposite and parallel to facing surfaces of the prisms, so as to modify simultaneously an optical path length of the first optical arm and the thickness of the variable-thickness system;

an output optical arm comprising a detector arranged to receive the output beam, and produce a signal representing an intensity of said output beam; and a calculation unit, adapted to calculate a Fourier transform of the signal produced by the detector, as a function of a parameter representing the difference in length of the optical path between the two arms;

characterized in that the mobile system has a single degree of freedom of movement and itself comprises:

at least one pair of levers having identical lengths within one and same pair, rotatably hinged about respective points that are fixed with respect to the splitting plate along respective main axes parallel to each other within the pair of levers, by means of rotating connexions, each with one single axis; and two support elements each borne by the two levers of one and the same pair by means of additional rotating connexions, each with one single axis parallel to the main axes of said pair of levers; and an actuation system, adapted to cause a rotation of the levers so that each support element is displaced while remaining parallel to itself when the actuation system is activated;

the internal and external prisms are respectively borne by the two support elements; and a ratio between respective displacement lengths of the internal and external prisms is constant and set by distances between the fixed points and the additional rotating connexions, so that the mobile system simultaneously produces a variation of the optical path length difference between the two optical arms and a self-apodization compensation of an interferogram resulting from the signal produced by the detector when the actuation system is activated.

2. The interferometer according to claim 1, in which the mirror of the second optical arm includes a reflecting treatment of an external face of the compensation assembly.

3. The interferometer according to claim 1, in which the two support elements are borne by the two levers of a single pair, so that said two support elements form, with said two levers, a deformable parallelogram; and for each lever, the fixed point about which said lever is rotatably hinged is situated between the two additional rotating connexions which respectively bear the two support elements for said lever.

4. The interferometer according to claim 1, in which each support element is borne by the levers of a pair different from the pair of levers bearing the other support element;

the actuation system is connected to one of the levers of each pair so as to cause displacements that are parallel but in the opposite directions at a same moment, for the two support elements.

5. The interferometer according to claim 1, in which, in the second optical arm, the compensation assembly itself comprises an internal prism and an external prism, that are additional to the internal and external prisms of the first optical arm, with respective opposite faces that are parallel between the internal and external prisms of the second optical arm, and the mirror is borne by an external face of the external prism of said second optical arm; and the internal and external prisms of the second optical arm are connected to the mobile system, so that the length of the optical path of one of the optical arms increases at the same time as the length of the optical path of the other optical arm reduces, when the actuation system is activated.

6. The interferometer according to claim 5, in which the respective external prisms of the two optical arms are fixed together on same one of the two support elements, and the respective internal prisms of the two optical arms are fixed together on the other one of the two support elements.

7. The interferometer according to claim 6, in which the two optical arms are antisymmetric with respect to each other for respective orientations of the external prisms on the one hand, and for respective orientations of the internal prisms on the other hand.

8. The interferometer according to claim 1, in which in each optical arm, the internal and external prisms have apex angles that are identical, and are constituted by one same transparent material.

9. The interferometer according to claim 1, in which each rotating connexion is constituted by a flexural pivot.

10. A method for spectral analysis of a radiation originating from a portion of the Earth's surface, comprising the following steps:

installing on board a satellite at least one optical and mechanical part of an interferometer according to any one of the preceding claims;

orbiting the satellite around the Earth;

orienting the satellite so that part of the radiation constitutes the initial beam;

while the radiation part propagates in the two optical arms of the interferometer, activating the detector and the actuation system simultaneously; and calculating the Fourier transform of the signal produced by the detector, as a function of the parameter representing the difference in the length of the optical path between the two arms, in order to obtain a spectral distribution characteristic of the radiation.

11. A process according to claim 10, in which the calculation unit of the interferometer is situated on Earth, and the signals produced by the detector for variable values of the difference in the length of the optical path between the two arms are transcribed into a transmission format then transmitted from the satellite to the calculation unit.

* * * * *